Figure 1:
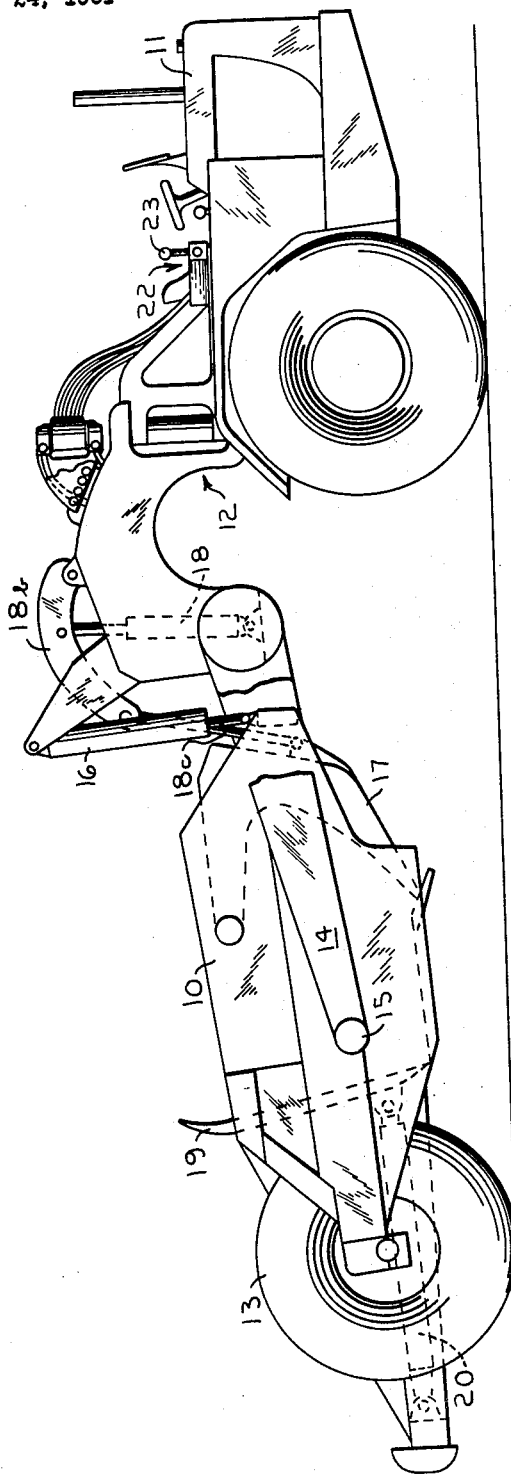

INVENTORS
ALLYN J. HEIN
BY JOHN A. JUNCK
ATTORNEYS

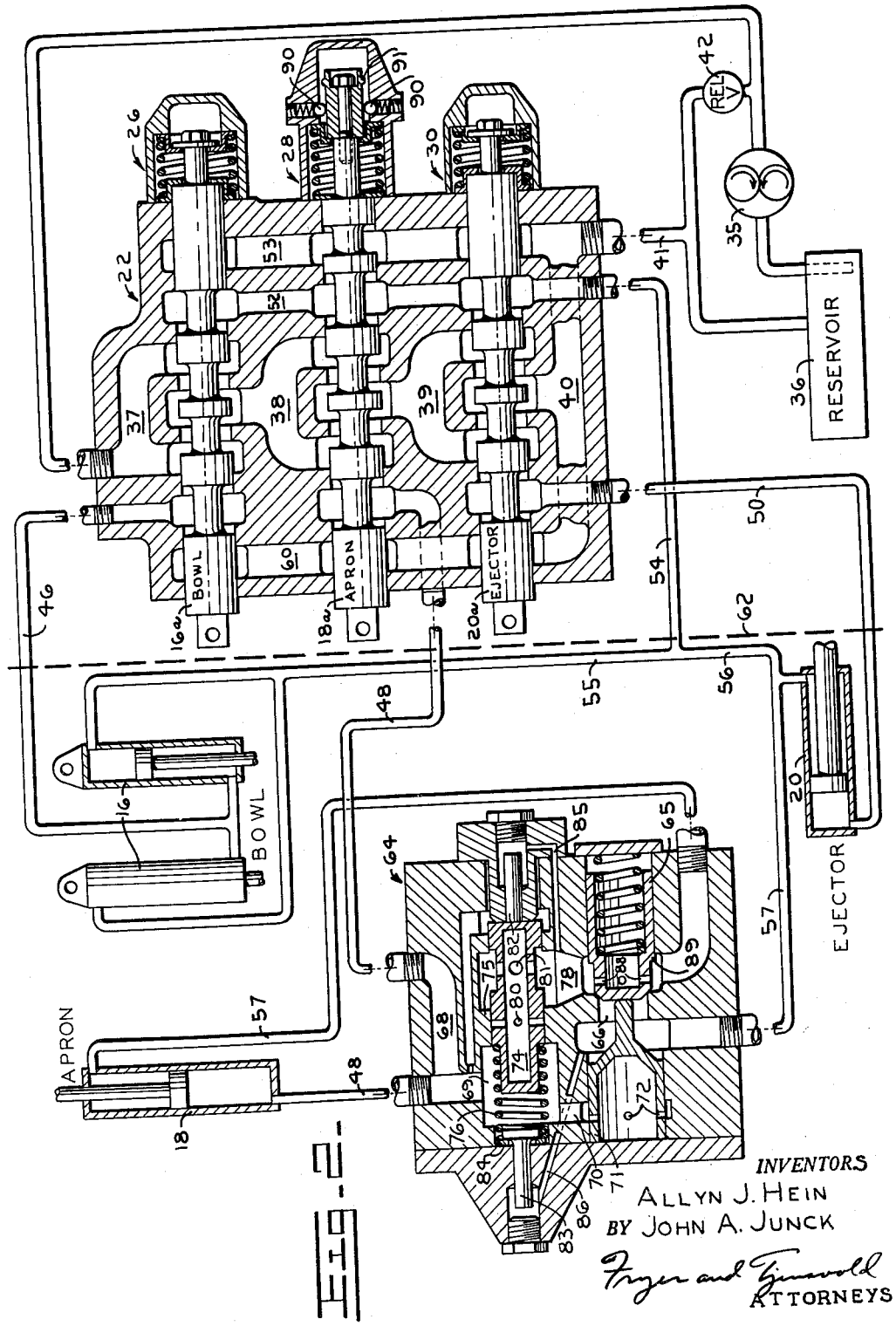

United States Patent Office 3,115,716
Patented Dec. 31, 1963

3,115,716
HYDRAULIC CIRCUIT FOR TRACTOR DRAWN
SCRAPERS AND THE LIKE
Allyn J. Hein and John A. Junck, Joliet, Ill., assignors to Caterpillar Tractor Co., Peoria, Ill., a corporation of California
Filed Nov. 24, 1961, Ser. No. 154,790
5 Claims. (Cl. 37—129)

This invention relates to hydraulic circuits for tractor drawn scrapers and more particularly to a circuit in which a minimum number of hydraulic lines or conduits is required between the control mechanism on the tractor and the controlling mechanism on the scraper which consists of fluid motors in the nature of double acting hydraulic jacks or the like.

The invention is described herein in its application to a tractor and scraper combination wherein the operator of the tractor has control of three double acting hydraulic jacks or sets of jacks for performing three separate functions on the scraper. This combination, however, is to be taken as typical of any tractor-implement combination where hydraulic lines must be carried between the tractor and the implement drawn by it for actuating more than a single fluid motor. These hydraulic lines are unsightly and dangerous sometimes requiring complex swivel connections between the tractor and implement and any reduction in their number is economically desirable.

It is the object of the invention to provide a hydraulic circuit for a plurality of fluid motors or the like wherein a single common line is employed for actuating the motors in one direction and wherein the motors are selectively controlled by three separate valves so that only four hydraulic lines are required, for example, to connect three control valves with three sets of double acting jacks instead of the usual six hydraulic lines employed for this purpose.

The use of a common line to one end of each jack requires that this line be opened for return flow to a reservoir for the hydraulic fluid upon actuation of any jack in one direction. Since all jack circuits are thus opened to the reservoir and since one jack is subject to movement in the same direction by external forces, it is a further object of the invention to provide means to prevent such unintentional movement of a jack under normal force but to permit it to move when the force exceeds a predetermined maximum.

Still further and more specific objects and advantages of the invention are made apparent in the following specification wherein the invention is described in detail by reference to the accompanying drawings.

In the drawings:

FIG. 1 is a view in side elevation of a tractor-trailer combination illustrating the location of the several components of the hydraulic circuit of the present invention; and FIG. 2 is a schematic view of the circuit.

In FIG. 1, a conventional two-wheel scraper is illustrated at 10 as drawn by a tractor 11 through a hitch or draft connection generally indicated at 12. The main body or bowl of the scraper may be raised and lowered about its pivotal connection with its wheels 13. Draft arms 14 pivoted to opposite sides of the scraper bowl, as by connections one of which is shown at 15, enable raising and lowering of the scraper bowl by means of a pair of jacks, one of which is shown at 16. A pivoted apron 17 is adapted to be raised and lowered for opening and closing the forward end of the bowl by means of a jack 18, lever 18b and link c, and an ejector 19 is moved forwardly to discharge the contents of the bowl through its forward end by an ejector jack 20, all in a well known manner. A control valve assembly 22 for controlling the flow of fluid to and from the several jacks is disposed on the tractor as are also control levers, one shown at 23, positioned adjacent the operator's station.

The control valve assembly 22 is schematically shown in FIG. 2 as comprising a single housing which is suitably bored for the reception of three sliding type valve spools 16a, 18a and 20a for controlling respectively the jacks 16, 18 and 20. Each of the spools is formed at one end for connection to control levers and is fitted at its opposite end with a centering spring assembly shown at 26, 28 and 30, the construction of such assemblies being well known and their function being normally to retain the valve spools in a central or neutral position. The centering spring assembly 28 includes detent means for retaining the spool 18 in one of its operating positions as will later be described in detail.

A pump 35 delivers fluid under pressure from a reservoir 36 to an inlet passage 37 in the valve housing which is divided to direct fluid selectively toward either one end or the other of the valve spool 16a depending upon its position of adjustment. Similar inlet passages 38 and 39 communicate with each other and with the first passage 37 so that with the valve spools in their neutral positions as shown, there is a constant flow of fluid under pressure from the pump through the passages 37, 38 and 39 and a discharge passage 40 and thence back to the reservoir through a return line 41. A relief valve 42 in the pressure line from the pump also has its discharge side connected with the return line 41.

Each of the jacks or sets of jacks has what may be termed a high pressure and a low pressure end because the work of moving an implement part in one direction, as when it is being raised or moving earth, is usually greater than that of moving it in the other direction. Movement of any one of the spools to the right connects it with the high pressure end of its associated jack. For example, the spool 16a upon movement toward the right opens communication with the inlet chamber 37 containing fluid under pressure from the pump and directs the liquid into a line 46 to the rod ends of the jacks 16 for raising the bowl. Movement of spool 18a to the right similarly connects the inlet passage 38 thereof with a line 48 connecting with the head end of the jack 18 through a valve mechanism presently to be described. Upon movement of the spool 20a to the right, fluid under pressure from inlet 39 thereof is directed through a line 50 to the head end of the ejector jack 20. For convenience in following these circuits, the drawings identify the jacks as well as the spools with the part of the implement with which they are associated.

The opposite or low pressure ends of the jacks are all connected with a common manifold 52 which, as shown in the drawing, communicates with each of the three bores which contain the valve spools and is opened by rightward movement of any spool into communication with a discharge manifold 53 also common to all three spools and communicating with the reservoir through the line 41. Consequently when fluid is directed under pressure to the high pressure side of any of the jacks, fluid on the low pressure side is returned to the reservoir. The common manifold 52 is connected with the jacks through a common line 54 with a branch 55 to the low pressure or head ends of the bowl jack 16, a branch 56 to the rod end of the ejector jack 20 and a branch 57 to the rod end of the apron jack through the valve mechanism which has not yet been described.

Movement of the jacks in the direction opposite that described above is accomplished by movement of any one of the valve spools in the opposite direction or to the left which communicates high pressure through the actuated spool to the manifold 52 and thence to all of the jacks through line 54 and its branches 55, 56 and 57. The valve spool which has been actuated to the left also opens communication to a discharge passage 60 which is common to all of the spools and similar to the discharge passage 53. The discharge passage 60 permits return of fluid from the jack being actuated through the passage 40 and line 41 to the reservoir. Under the condition just described where a single valve spool is actuated and directs fluid to all three jacks, only the selected jack is moved because return flow from the other jacks is blocked by their respective spools which have remained in their neutral position.

The advantage obtained by the use of a single line leading from the control valve assembly toward the jack to be actuated can be appreciated from FIG. 2 wherein a broken line 62 represents the location of the pivotal draft connection 12 (FIG. 1) between the tractor and the scraper. Thus with the control valve on the tractor and the jacks to be actuated thereby on the scraper it is necessary to cross the pivotal draft connection with only four lines instead of the usual six required for the operation of three sets of double acting jacks.

One problem which raises in connection with the use of a common return line for three separate jacks or sets of jacks is that the return line on the low pressure side of all of the jacks is opened to the reservoir when any spool is moved to the right for the purpose of actuating a jack from its high pressure side. This results from the fact that passages 52 and 53 are interconnected by movement of any spool to the right thus not only opening the return line for the energized jack but communicating the return side of all the jacks to the reservoir. This does not present a problem in connection with either of the ejector or the bowl. Gravity prevents the bowl from rising and forcing return fluid from the head ends of the jacks 16 through the common return line. Inertia prevents forward movement of the ejector. However, the apron is often subjected to upward forces as for example during a loading operation when earth in advance of the scraper piles or boils up against the lower part of the apron which should remain in a fixed position for efficient loading.

To prevent upward movement of the apron in response to such external forces a check valve is employed in its low pressure return line. The check valve is normally closed but opened by pressure in the supply line when it is pressurized to raise the apron. This check valve is a part of a combination check and relief valve assembly generally indicated at 64 in FIG. 2. It comprises a spring actuated valve element 65 normally closing a port 66 in passages which connect to portions of the apron low pressure return branch line 57. Thus fluid in the rod end of apron jack 18 is blocked and external forces will not raise the apron. When it is desired to raise the apron by actuation of the apron spool 18a pressure in the line 48 to the head end of the apron jack is present in a chamber 68 of the valve 64, which chamber connects to parts of the line 48. This pressure is communicated through a spring chamber 69 and a passage 70 to the interior of a hollow piston 71 through orifices 72 in its wall. This piston is aligned with the valve elements 65 and has an end projecting into contact therewith so that movement of the piston in response to the pressure described opens the check valve to permit return of fluid from the rod end of jack 18.

There are two instances in which it is desirable to permit the apron to raise with spool 18a in a "neutral" or "hold" position. One is when external forces tending to raise the apron become excessive and might result in damage to the apron structure. The other instance occurs when the loading cycle of the scraper is complete and the operator raises the bowl to the carry position which is that shown in FIG. 1. Since the apron is carried by the bowl it raises with the bowl and the piston in jack 18 must move upwardly and eject fluid through its return line 57. These difficulties are overcome by a pressure relief valve which provides communication between the rod end and the head end of the jack 18 when external forces tending to raise the apron exceed a predetermined maximum. This relief valve comprises a hollow spindle 74 slidably mounted in and normally closing an opening in a wall 75. A spring 76 in the spring chamber 69 normally holds the valve spindle 74 in its closed position as shown. When the spindle is moved to the left against the force of the spring 76 it communicates pressure from the rod end of the jack through the line 57 and a chamber 78 to the head end of the jack through the line 48, chamber 68 and spring chamber 69. The pressure is communicated through orifices 80 and 81 in the wall of the hollow spindle 74 which, when the spindle is in its open position, communicate between opposite sides of the wall 75. The position of the spindle 74 is also influenced by pressure acting on pistons disposed at its opposite ends. A piston 82 engages one end of the spindle 74 and a piston 83 extends through a seat 84 of the spring 69 adjacent its opposite end. Under normal pressure conditions in the return line 57 equal pressure is exerted on pistons 82 and 83, this pressure being communicated to their outer ends through passages 85 and 86, respectively, and is effective to bring piston 83 into contact with the left end of spindle 74 which is retained in its closed position by the force of the spring 76. When pressure in the rod end of the apron jack 18 exceeds a predetermined maximum while the check valve is closed it is communicated through passages 78 and 85 to piston 82 which then overcomes the force of spring 76 to move spindle 74 to its open position forming communication between opposite ends of the jack 18. The pressure required to open the relief valve 74 is of course considerably below the maximum pressure which opens the safety relief valve 42.

Orifices 88 in check valve 65 prevent the occurrence of a fluid lock in the spring chamber of the valve and also admit pressure from line 57 to the interior of the check valve to prevent it from being opened by pressure acting against a shoulder 89 thereon.

It is desirable under some operating conditions to permit the apron to "float" downwardly in relation to the bowl such that the apron will close automatically as the bowl is raised from the ground as the loading cycle is completed. To this end the valve 18a is designed to provide communication between the head end of the jack and the reservoir in a well known manner when the spool is in its extreme left position. Communication between the rod end of jack 18 and line 54, which is interconnected with passage 38 and manifold 53, is blocked by valve element 65 to prevent upward movement of the apron at this time. Downward movement of the apron under this condition tends to evacuate the rod end of jack 18 by downward movement of its piston. This creates a pressure differential on opposite sides of valve element 65 and permits it to be opened and admit make-up fluid to the rod end of jack 18 from pump 35 through line 54. The valve spool is retained in this position without attention from the operator by detent means shown as a pair of spring pressed balls 90 associated with the centering device 28 and engageable behind a projection 91 on an extension of the valve spool. This leaves the operator free to manipulate valve 16a to raise the bowl at the end of the loading cycle.

We claim:

1. In combination with a tractor and implement drawn thereby through an articulate draft connection wherein a plurality of double acting hydraulic jacks are employed for controlling separate elements on the implement independently of each other are actuated by a source of pressure and control valves on the tractor, a hydraulic circuit including said jacks, source and valves and having separate conduits bridging said articulate draft connection for supply and return fluid to one end of each jack, and a single conduit bridging said articulate draft connection for supply and return fluid to the opposite ends of all of said jacks.

2. In a tractor scraper combination including a scraper having a bowl element, an ejector element therein and an apron element therefor and having a separate double acting jack for adjusting each of said elements, and wherein a source of fluid under pressure and control means are carried by the tractor to actuate said jacks, a fluid circuit including separate conduits from the control means to the several jacks to actuate them in one direction, a common return conduit for communicating fluid from all jacks back to the source when they are actuated in said one direction, and means to prevent actuation of said apron element by external forces when said common return conduit is open in response to actuation of one of said other elements.

3. The combination of claim 2 in which said preventing means comprises, a normally closed check valve preventing return flow from the apron jack through said common return conduit, and means responsive to pressure in the separate conduit to the apron jack for opening said check valve.

4. The combination of claim 2 in which the circuit to the apron jack includes a pressure relief valve controlling communication between opposite ends of the jack and opened by excessive pressure occasioned by external forces.

5. The combination of claim 4 including means to prevent opening of said relief valve when source pressure is directed to the apron jack through said common conduit.

References Cited in the file of this patent

UNITED STATES PATENTS

| | | |
|---|---|---|
| 700,162 | Wiley | May 13, 1902 |
| 1,982,219 | McAlister | Nov. 27, 1934 |
| 1,994,974 | Wiedmann | Mar. 19, 1935 |
| 2,047,027 | Le Bleu | July 7, 1936 |
| 2,157,311 | Walch | May 9, 1939 |
| 2,273,010 | Austin | Feb. 17, 1942 |
| 2,274,527 | Buran et al. | Feb. 24, 1942 |
| 2,501,483 | Taylor | Mar. 21, 1950 |
| 2,935,852 | Russell | May 10, 1960 |
| 2,949,741 | Troche | Aug. 23, 1960 |
| 2,988,891 | Hemings | June 20, 1961 |